(12) United States Patent
Shimoda et al.

(10) Patent No.: US 6,675,249 B2
(45) Date of Patent: Jan. 6, 2004

(54) INFORMATION PROCESSING EQUIPMENT AND INFORMATION PROCESSING SYSTEM

(75) Inventors: Teruaki Shimoda, Hadano (JP); Ryo Yamagata, Sagamihara (JP); Kei Yamamoto, Zama (JP)

(73) Assignee: Hitachi, Ltd., Tokyo (JP)

( * ) Notice: Subject to any disclaimer, the term of this patent is extended or adjusted under 35 U.S.C. 154(b) by 524 days.

(21) Appl. No.: 09/750,960

(22) Filed: Dec. 27, 2000

(65) Prior Publication Data

US 2001/0005871 A1 Jun. 28, 2001

(30) Foreign Application Priority Data

Dec. 27, 1999 (JP) .............................. 11-369147

(51) Int. Cl.⁷ .............................................. G06F 13/00
(52) U.S. Cl. ....................................... 710/305; 713/400
(58) Field of Search ........................... 710/305; 713/400, 713/401, 500, 501, 502, 503, 600; 327/156

(56) References Cited

U.S. PATENT DOCUMENTS

| | | | | |
|---|---|---|---|---|
| 5,034,967 A | * | 7/1991 | Cox et al. ..................... | 375/373 |
| 5,056,120 A | * | 10/1991 | Taniguchi et al. ........... | 375/371 |
| 5,410,263 A | * | 4/1995 | Waizman ..................... | 327/141 |
| 5,481,731 A | | 1/1996 | Conary et al. | |
| 5,485,602 A | | 1/1996 | Ledbetter, Jr. et al. | |
| 5,675,274 A | * | 10/1997 | Kobayashi et al. ......... | 327/158 |
| 5,811,998 A | * | 9/1998 | Lundberg et al. ........... | 327/156 |
| 5,862,373 A | * | 1/1999 | Pathikonda et al. ........ | 713/501 |
| 5,909,563 A | * | 6/1999 | Jacobs ......................... | 710/305 |
| 5,944,834 A | * | 8/1999 | Hathaway .................... | 713/500 |
| 5,964,880 A | * | 10/1999 | Liu et al. ..................... | 713/401 |
| 6,041,093 A | * | 3/2000 | Cho ............................. | 377/47 |
| 6,092,210 A | * | 7/2000 | Larky et al. ................ | 713/400 |
| 6,128,025 A | * | 10/2000 | Bright et al. ................ | 345/504 |

FOREIGN PATENT DOCUMENTS

| | | |
|---|---|---|
| JP | 5-233275 | 9/1993 |
| JP | 7-210267 | 8/1995 |

* cited by examiner

Primary Examiner—Xuan Thai
(74) Attorney, Agent, or Firm—Townsend and Townsend and Crew LLP

(57) ABSTRACT

An information processing equipment designed to support the compatibility of a plurality of clocks such as its internal clock and a clock for external bus interface by using only a single wired-in line for supplying the internal clock; and to perform frequency conversion control only in a logical circuit with the internal-to-external clock frequency ratio being N:1 or N:2 for the clocks, wherein the equipment comprises: a signal generator for supplying a common reference clock to itself and peripheral equipment and generating a reference sync signal from the reference clock to synchronize itself and the peripheral equipment; a signal generator for generating its internal clock from the reference clock; a signal generator for generating timing signals to control the timing of access to the external bus in accordance with an internal-to-peripheral clock frequency ratio; and a bus I/O signal conversion circuit for carrying out data input/output from/to the bus in accordance with generated timing signals.

20 Claims, 11 Drawing Sheets

INFORMATION PROCESSING EQUIPMENT AND INFORMATION PROCESSING SYSTEM

BACKGROUND OF THE INVENTION

The present invention relates to input/output to/from a microprocessor system, particularly to a technique of controlling the frequency conversion for clock frequency matching between a processor and its peripherals such as an L2 cache and an external bus that operate, based on a clock frequency different from the clock frequency for processor operation.

Processors used in the field of information processing systems and control equipment are required to have more increased performance with a higher processing rate, causing the operating clock frequency of processors to become higher. On the other hand, peripherals such as L2 caches, memory controllers, external buses, and network adapters, operate at a lower frequency because of cost reduction and energy saving. In multiprocessor systems, the communication rate between processors depends on the communication path wiring delay and this limits the clock frequency for bus operation. It is thus important to support a lower clock frequency for bus operation than the clock frequency for processor operation.

Japanese Patent Prepublication (J-P-A) No. Hei 7-210267 (its U.S. version is U.S. Pat. No. 5,485,602) disclosed a method that a single clock that is externally input is used as an internal clock. If this method is applied to a system comprising many interconnected units such as a multiprocessor system, however, clock skew is a problem when synchronizing the units.

As described in J-P-A No. Hei 5-233275, another method is known that as many clocks as the required number of clock lines are generated, each clock being at a fixed frequency and a given phase to other clocks. This is accomplished by PLL circuits and a higher frequency clock is used as the clock for a processor and a lower frequency clock is used for a bus I/O signal conversion circuit that interfaces with an external bus. In order to synchronize the internal and external components of a processing equipment or system, each operating, based on one of a plurality of clocks of different frequencies, schemes of supplying different clocks by using PLL have been developed. Examples of these schemes are given below.

Figure 2:
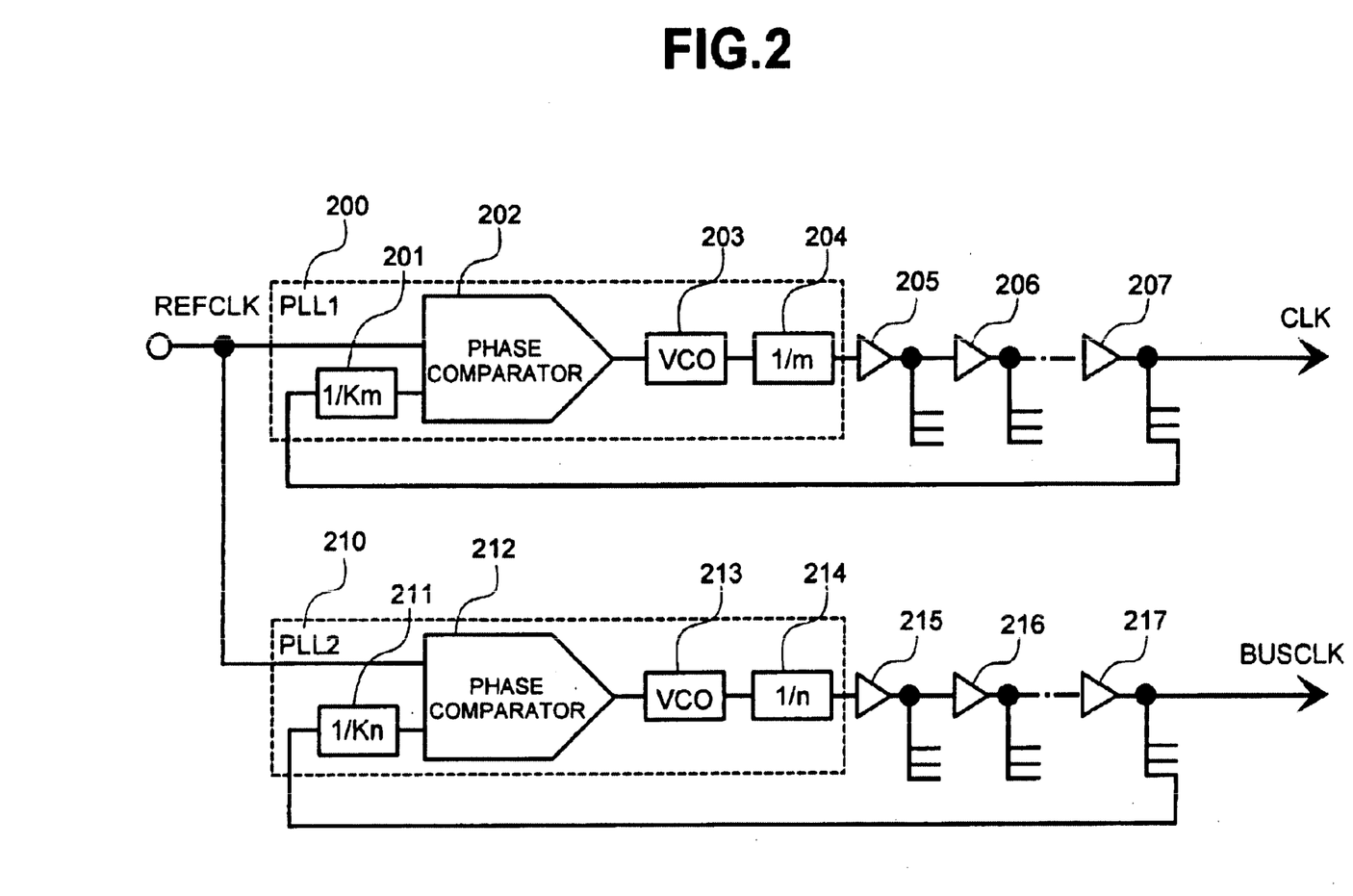
FIG. 2 is a schematic circuit diagram illustrating the multiple PLLs scheme.

A first one is a multiple PLLs scheme is such that as many independent PLLs as the number of clock supply lines are prepared as will be shown in FIG. 2. Because each clock line has its feedback in this scheme, phase matching is possible even if the clock supply lines are used to supply different clocks.

Figure 3:
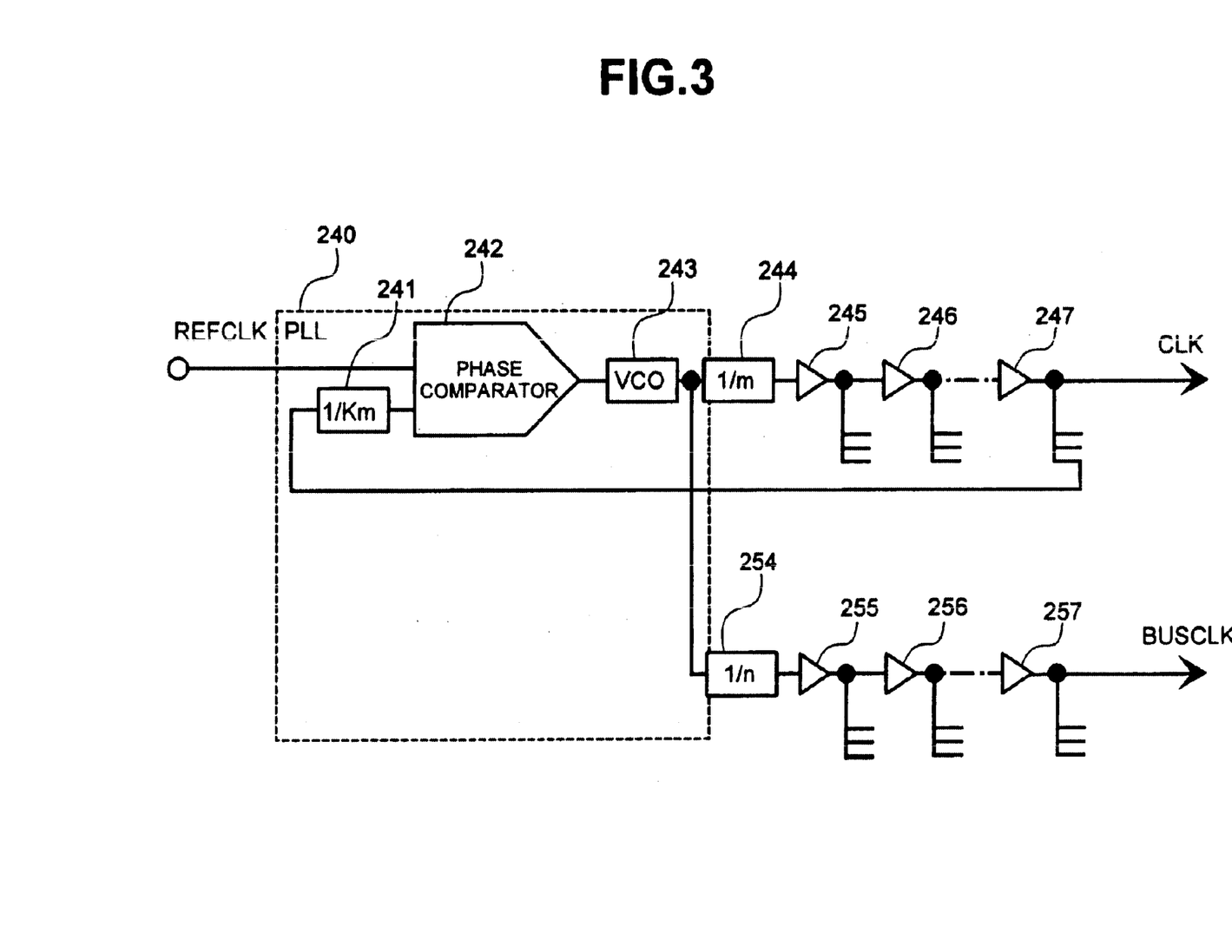
FIG. 3 is a schematic circuit diagram illustrating the multiple dividers scheme.

A second one is a multiple dividers scheme is such that only a single PLL is used and as many dividers as the number of clock supply lines are connected to its voltage control oscillator (VCO) to supply different clocks as will be shown in FIG. 3. The second scheme can avoid the interference between the PLLs that is a problem of the multiple PLLs scheme.

If a plurality of clock lines are wired on a chip to supply an internal clock, a clock for L2 cache interface, and a clock for external bus interface, according to the above schemes, the phase matching of different clock lines involves the following problems.

For the multiple PLLs scheme, because each clock line has its feedback as will be shown in FIG. 2, any clock skew can be adjusted to the internal clock. However, the clock for L2 cache interface and the clock for external bus interface have a smaller rate of FF to drive than the internal clock, but theses clock supply lines extend over the chip because of I/O-related circuits and need to be wired in the same method for supplying the internal clock. Thus, the wiring area is (the wiring area for internal clock) multiplied by (the number of clock lines) and the consumed power increases proportionally. In addition, the problem of interference between PLLs makes the wiring of the PLLs difficult.

For the multiple dividers scheme, because of the single PLL as will be shown in FIG. 3, the interference problem is eliminated. However, the feedback control of PLL is provided for only one of all clock lines and therefore the phase matching for the remaining clock lines must be performed without feedback. Consequently, all clock supply lines need to be designed equally and wired as is for the internal clock supply circuit, similar to the first scheme, and this increases the wiring area and consumed power.

SUMMARY OF THE INVENTION

Objects of the present invention is supplying only a reference clock to internal and external components of information processing equipment so that the components will be synchronized easily and performing frequency conversion control for frequency matching between a plurality of clocks only in a logical circuit by using clock pulses generated from the reference clock in order to solve the above problems. The invention is also intended to provide a bus interface controller and processing equipment on which the bus interface controller is installed. The bus interface controller performs frequency conversion control for clock frequency matching between internal and external clocks, especially when the internal-to-external clock frequency ratio is N:1 or N:2, only in a logical circuit with only an internal clock supply line instead of wiring a plurality of clock lines, such that the processor and peripherals can be synchronized easily and clock supply wiring can be performed with smaller wiring area and lower power consumption.

The bus interface controller offered by the present invention needs only the reference clock to synchronize the internal and external components of the processing equipment or system and includes a means to generate a reference sync signal for synchronizing the components and an internally operating clock of the equipment from the reference clock. The bus interface controller also includes a synchronous counter that determines the number of counts in accordance with a preset clock frequency ratio and is reset by the above reference sync signal. The bus interface controller also includes a means to generate timing signals for access to peripheral equipment by the comparison between the preset clock frequency ratio and the synchronous counter. The bus interface controller also includes a means to perform frequency conversion control of input/output signals to/from another processor, peripheral equipment, or bus only in a logical circuit, supplied with the internally operating clock across only a single line as the clock on which the equipment operates and by using the access timing signals as enable signals to be applied to latches for external interface control that are activated by an enable signal. The bus interface controller also includes a function of accessing another processor, peripheral equipment, or bus that operates at a rate of 2/N [where N≧2] (1, 1/1.5, 1/2, 1/2.5, 1/3, . . . ) of the internally operating clock frequency by using clock pulses of 50% duty as the internal clock. The bus interface controller also includes a function of accessing another processor, peripheral equipment, or bus that operates at a rate of M/N [where N≧M≧2] of the internally operating clock frequency by using M-phase clock pulses with each in phase shifted by 1/M cycle or clock pulses of 50% duty with a frequency that is M/2 times the frequency of the internal clock.

BRIEF DESCRIPTION OF THE DRAWINGS

A preferred form of the present invention is illustrated in the accompanying drawings in which.

PREFERRED EMBODIMENTS OF THE INVENTION

Preferred embodiments of the present invention will be explained below, based on the drawings. For simplicity, an example case where two clocks are used, internal clock CLK and external bus clock BUSCLK will be discussed below.

Figure 1:
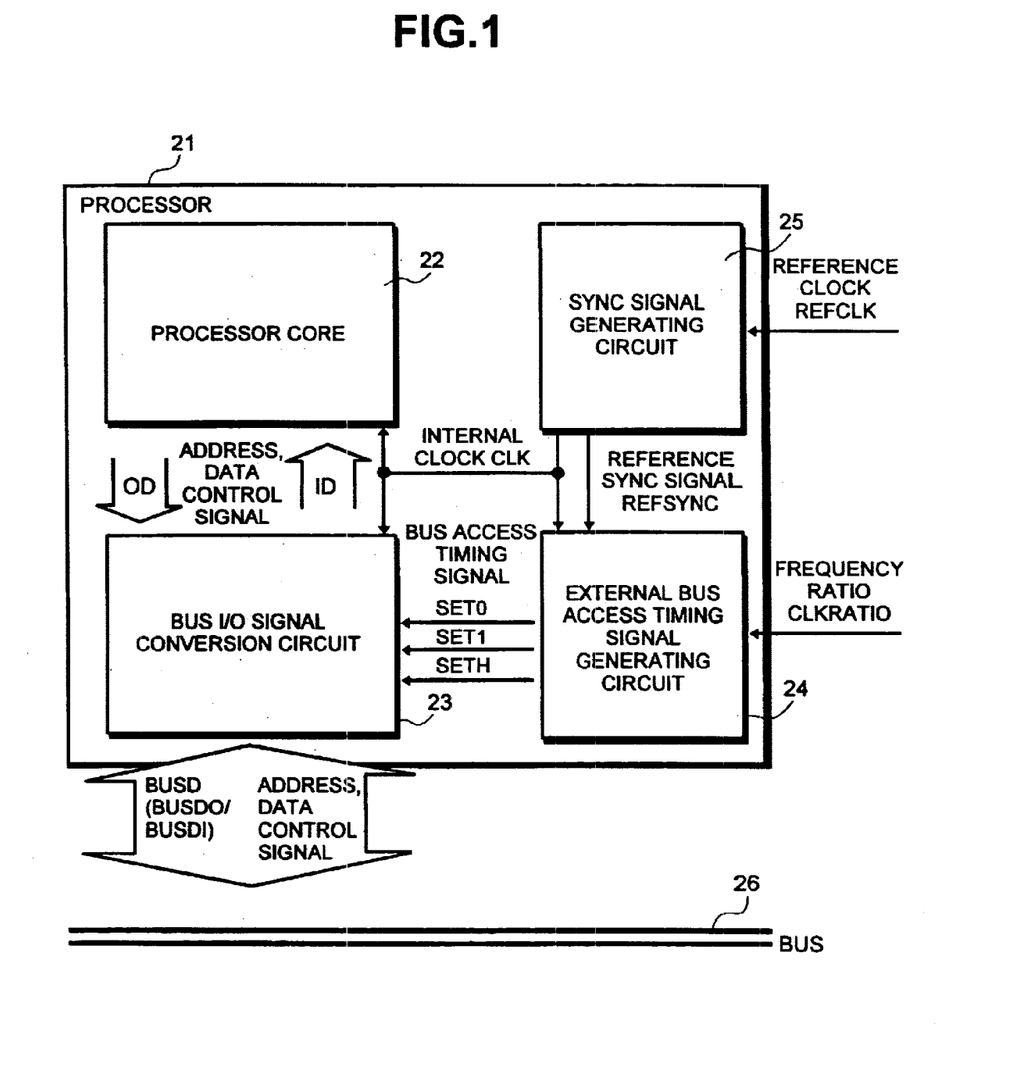
FIG. 1 is a schematic diagram showing a processor equipped with the bus interface controller configured, according to a preferred embodiment of the present invention.
Figure 6:
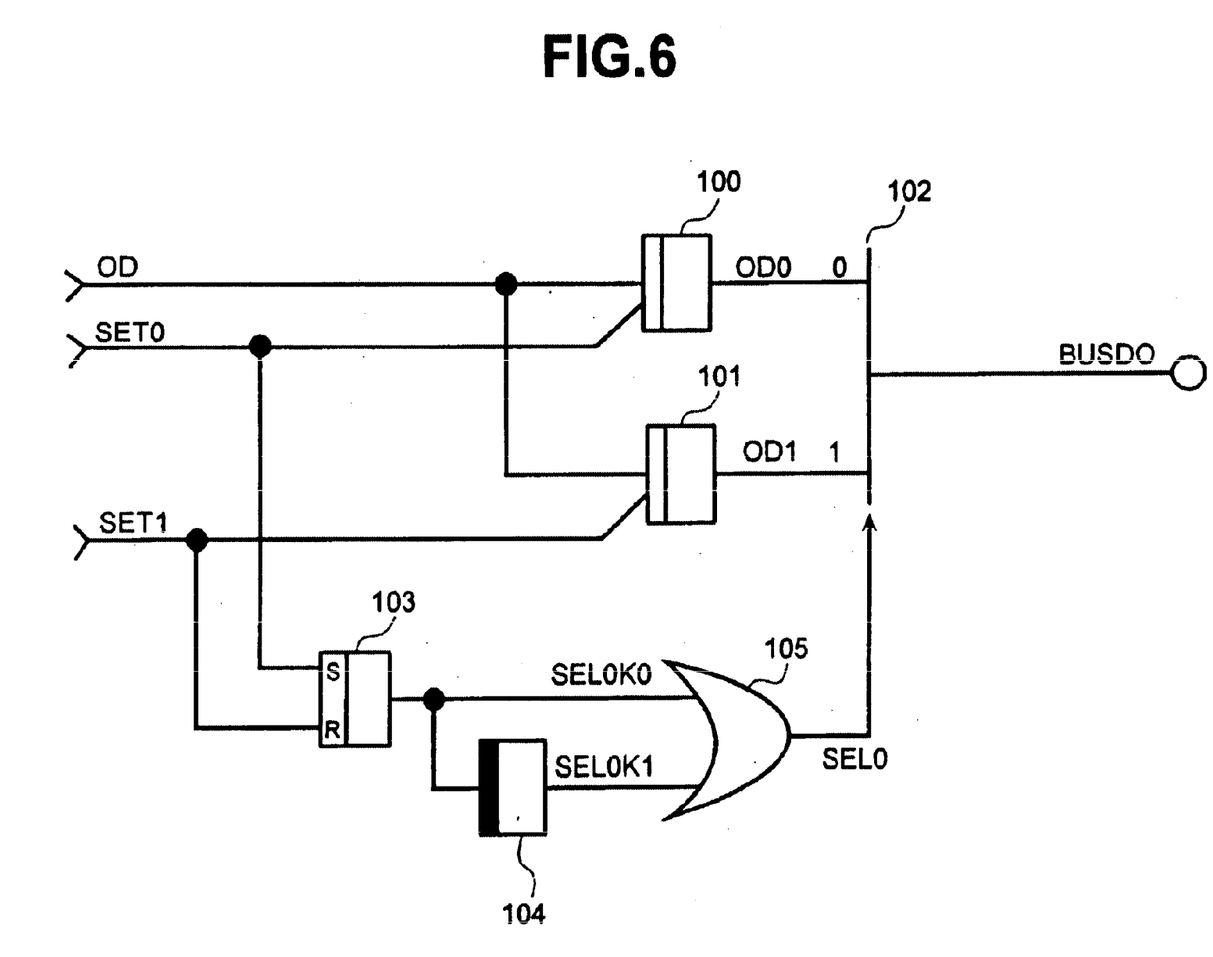
FIG. 6 is a schematic circuit diagram showing an aspect of the bus I/O signal conversion circuit included in FIG. 1, embodied for illustrating the intended output operation of the circuit at ratios of the processor's internal processing rate to the external bus rate of N:1 and N:2.
Figure 7:
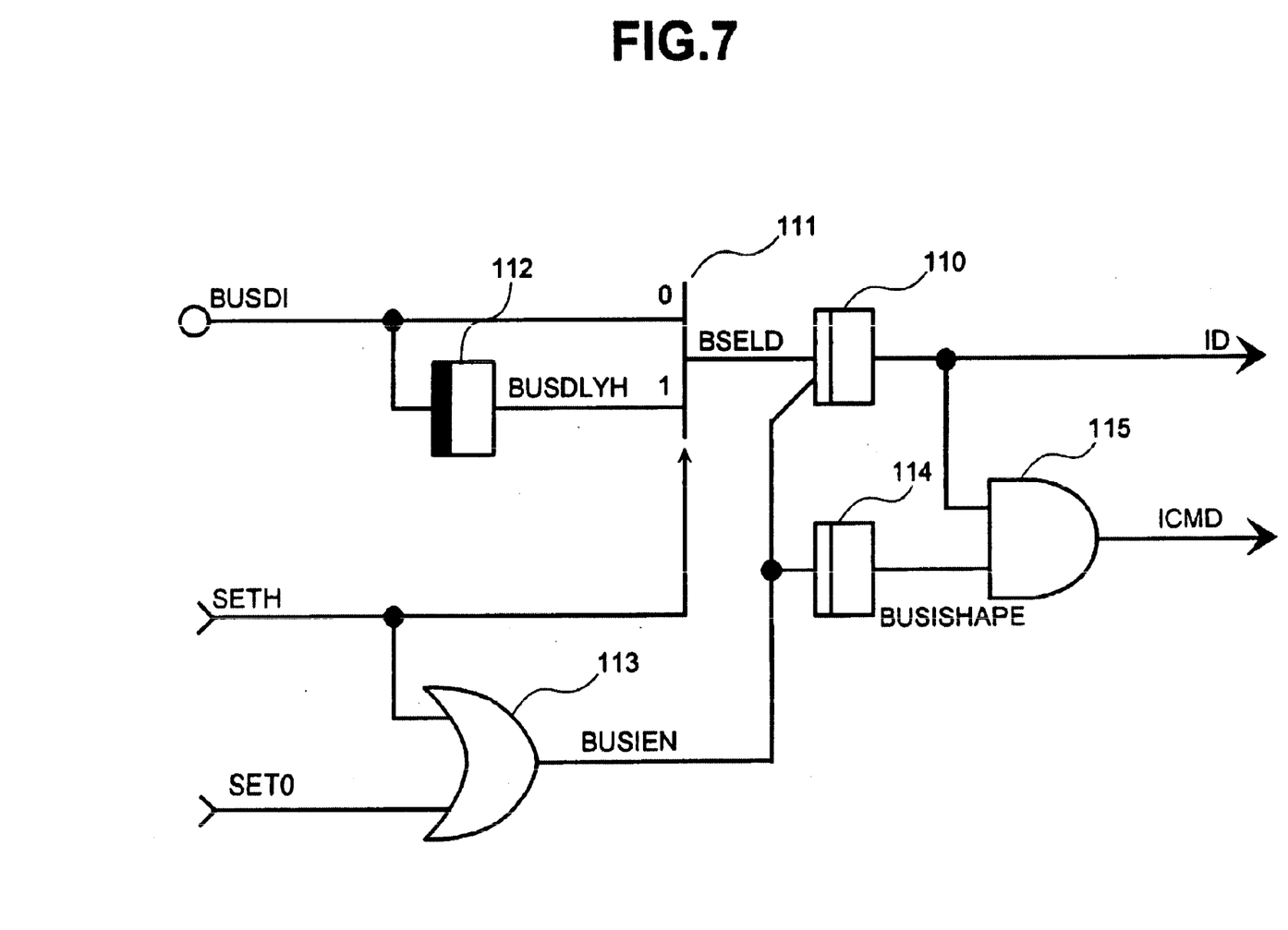
FIG. 7 is a schematic circuit diagram showing an aspect of the bus I/O signal conversion circuit shown in FIG. 1, embodied for illustrating the intended input operation of the circuit at ratios of the processor's internal processing rate to the external bus rate of N:1 and N:2.

FIG. 1 is a diagram showing a processor system configured, according to a preferred embodiment of the present invention. A sync signal generating circuit 25 generates an internal clock CLK and a reference sync signal REFSYNC from the reference clock REFCLK that is input from outside the processor 21. From the reference sync signal REFSYNC, an external bus access timing signal generating circuit 24 generates bus access timing signals. According to the bus access timing signals, a bus I/O signal conversion circuit 23 executes the conversion of address, data, and control signals (OD and ID denote the output and input directions of the signals) from/to a processor core to BUSCLK-clocked address, data, and control signals (all of which are called BUSD signals with BUSDO and BUSDI denoting their output and input directions) and vice versa. The structure of the sync signal generating circuit 25 is shown in FIG. 4; the configuration of the external bus access timing signal generating circuit 24 is shown in FIG. 5; the output processing circuitry of the bus I/O signal conversion circuit 23 is shown in FIG. 6: and the input processing circuitry thereof is shown in FIG. 7.

Figure 4:
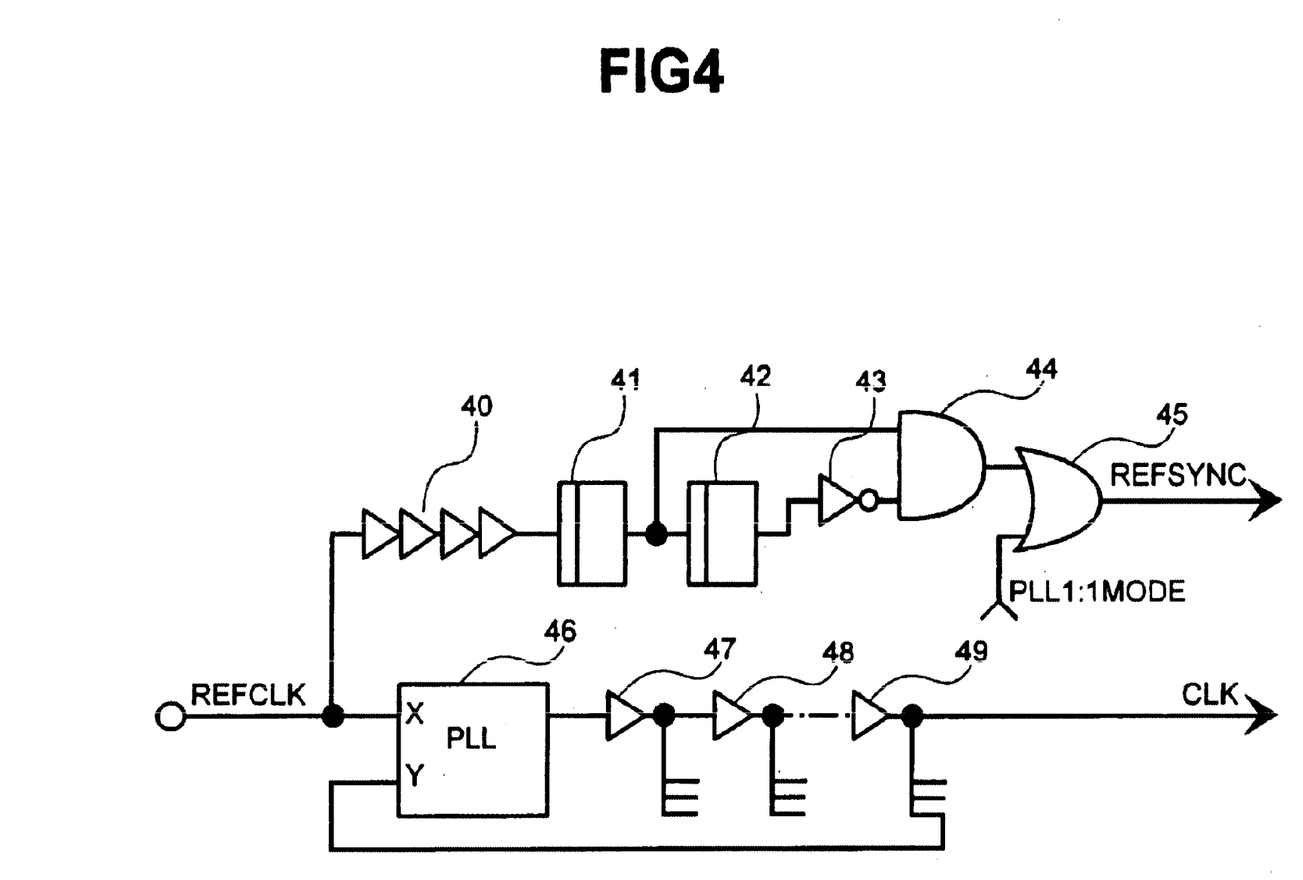
FIG. 4 is a schematic circuit diagram of the sync signal generating circuit included in the processor shown in FIG. 1.

FIG. 4 is a schematic circuit diagram of the sync signal generating circuit 25. Supplied with the REFCLK input, a PLL 46 generates a CLK. The CLK is distributed throughout the processor 21. To fix the phase of the CLK, the CLK is fed back to the PLL. The REFCLK is delayed by a delay element 40, delayed by one cycle through a latch 41, and further delayed by one cycle through a latch 42. Then, the REFCLK signal is inverted and logically multiplied, by which differentiation of the rising edge of REFCLK makes a REFSYNC signal. The REFSYNC is a signal that is one cycle asserted in synchronization with one period of the REFCLK and is used to periodically reset the synchronous counter of the external bus access timing signal generating circuit 24. Because a mode is provided in which the CLK is directly supplied from an external pulse generator without using the PLL, the REFSYNC is always asserted by using the combination of a PLL1: 1MODE signal that indicates the mode and a logical add 45.

Figure 5:
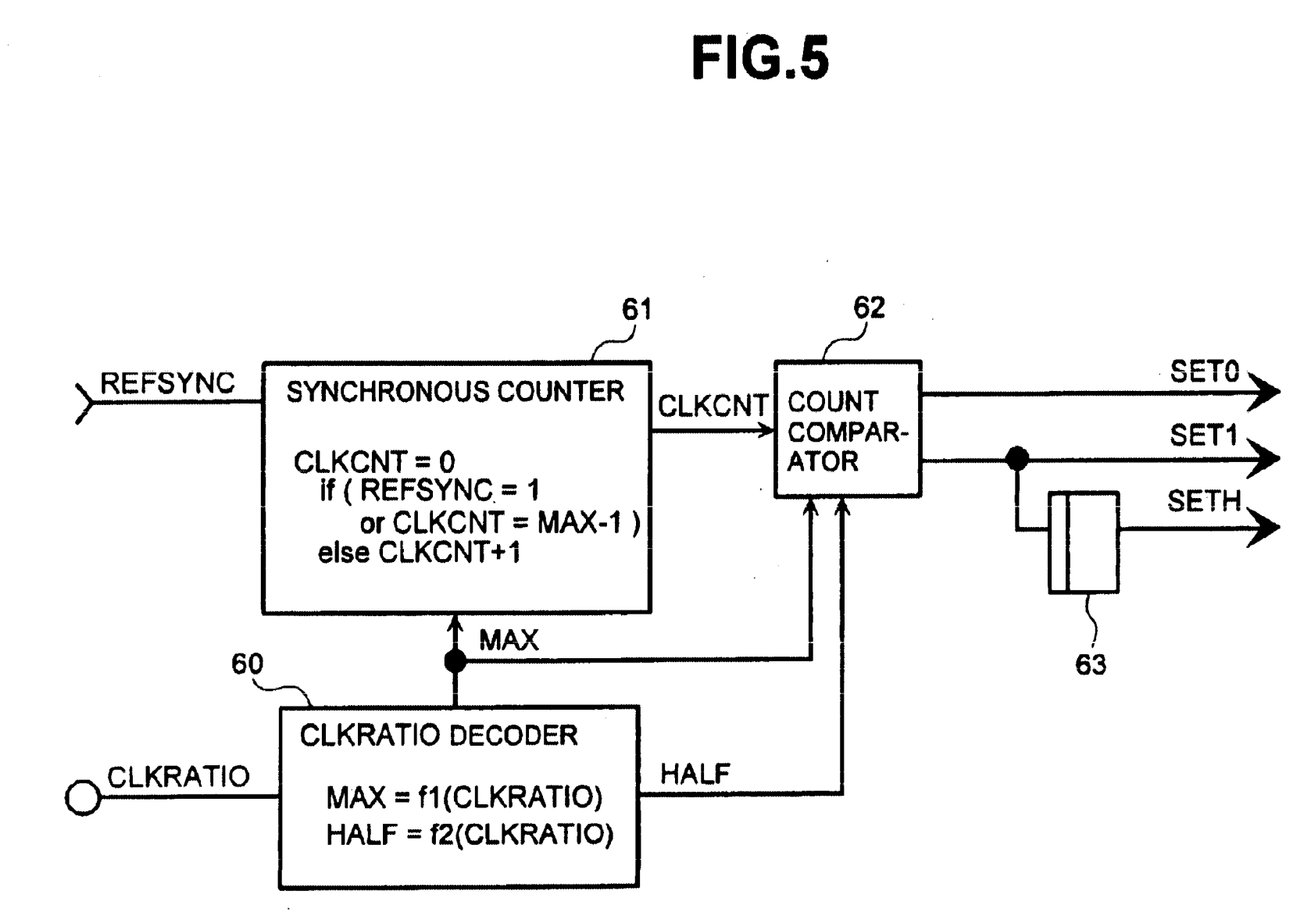
FIG. 5 is a schematic diagram showing the configuration of the external bus access timing signal generating circuit included in the processor shown in FIG. 1.

FIG. 5 shows the configuration of the external bus access timing signal generating circuit 24. A CLKRATIO decoder 60 generates a MAX signal (N of the internal-to-external clock frequency ratio N:2) indicating the maximum value of the synchronous counter 61 and a HALF signal indicating a fractional ratio such as an internal-to-external clock frequency ratio of 3:2 or 5:2 from the CLKRATIO. After resetting the REFSYNC, the synchronous counter 61 outputs the counts from 0 to MAX−1 as CLKCNT. A count comparator 62 compares the CLKCNT and the MAX or the HALF and generates SET0 and SET1 bus timing signals. A latch 63 delays the SET1 signal by one cycle and makes a SETH signal.

The SET0 and SET1 are output enable signals that enable the output from the bus I/O signal conversion circuit 23 to the bus 26. The SET0 and SETH are input enable signals that enable the input from the bus 26. When HALF is not asserted (the internal-to-external clock frequency ratio is a ratio of integers), however, the SET1 and SETH signals are not asserted. The SET0 and SET1 are asserted at given CLKCNT values determined by clock frequency ratio CLKRATIO. A logical circuit to generate the SET0 and SET1 signals for all possible cases where one of the given CLKCNT values is true is installed in the count comparator 62.

FIG. 6 shows an aspect of the bus I/O signal conversion circuit 23 embodied to process one output signal. An output signal OD passes through a latch 100 that is enabled by SET0 and becomes an output signal OD0, and at the same time, it passes through a latch 101 that is enabled by SET1 and becomes an output signal OD1. SEL0K0 is a signal that is output from an SR latch 103 to which SET0 is input as a set signal and SET1 is input as a reset signal. SEL0K1 is an output from a falling-edge-triggering latch 104 (this latch is supplied with a clock input, NOT of the internal clock assuring 50% duty) to which SEL0K0 is input. SEL0 is an output from a logical add 105 of SEL0K0 and SEL0K1 and supplied to a 2-input selector 102 as a select signal. The 2-input selector 102 selects the OD0 output signal when SEL0 is 0 or the OD1 output signal when SEL0 is 1 and outputs it as BUSDO.

FIG. 7 shows another aspect of the bus I/O signal conversion circuit 23 embodied to process one input signal. A 2-input selector 111 selects an input signal from the bus when SETH is 0 or BUSDLYH that is an output from a falling-edge-triggering latch 112 to which the input signal BUSDI is input when SETH is 1 and outputs it as BSELD.

An enable signal BUSIEN is output from a logical add 113 to which SET0 and SETH are input. The BSELD passes through a latch 110 enabled by the BUSIEN and becomes ID as an output signal from the latch 110. Then, by logical multiplication of the ID and BUSISHAPE that is a signal delayed by one cycle by passing the BUSIEN through a latch 114, a one cycle long signal is taken out of the ID as an input signal ICMD to the control mechanism so as to be used in the internal circuit. Instead of the falling-edge-triggering latch and the internal clock assuring 50% duty, a normal latch and an another source clock that is 0.5 cycle behind the internal clock can be used.

Figure 8:
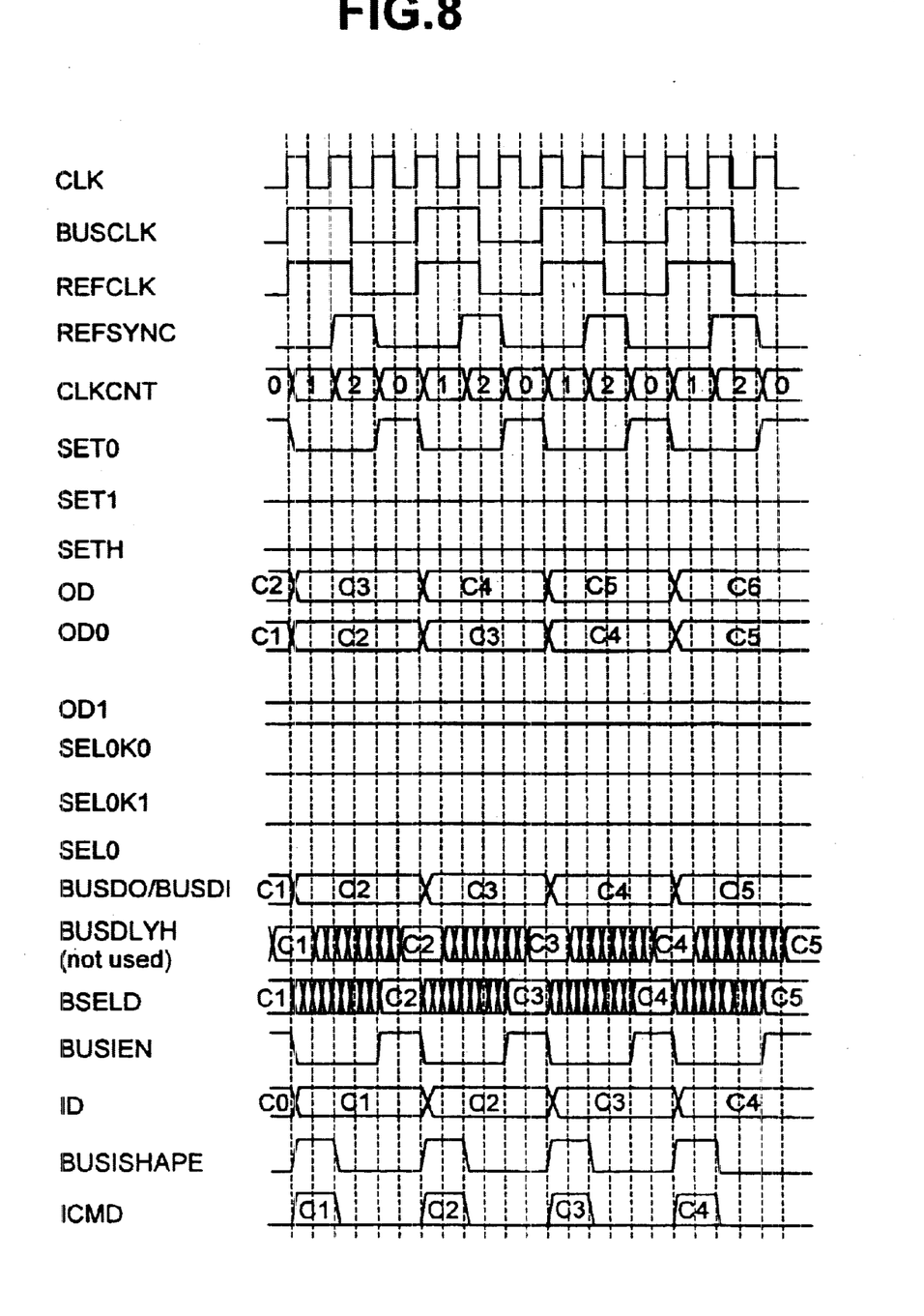
FIG. 8 is a time chart for input/output to/from the processor when the ratio of the processor's internal processing rate to the external bus rate is 3:1 in the circuit aspects shown in FIGS. 6 and 7.

FIG. 8 shows the timing chart of input/output to/from the processor core when the clock frequency ratio of the internal clock CLK to the bus clock BUSCLK and the reference clock REFCLK is 3:1:1 in the circuit aspects shown in FIGS. 6 and 7.

Using FIGS. 6 and 8, the operation of the bus output signal conversion circuit aspect is explained below. In the case where the above clock frequency ratio is true, SET0 is asserted to be 1 when CLKCNT is 0 and SET1 is always 0 in the circuit section for processing output signals to the bus. Thus, SEL0K0 and SE0K1 are always 0 and SEL0 is 0. Consequently, as the bus output signal BUSDO, OD0 that is always one bus cycle behind the OD is selected and output to the bus.

Using FIGS. 7 and 8, the operation of the bus input signal conversion circuit aspect is explained below. In the circuit section for processing input signals from the bus, SET1 is always negated to 0 and therefore SETH is always 0, and BUSDI is selected to be BSELD. Because BUSIEN is equal to SET0, ID is always one bus cycle behind the BUSDI. When the ID is used as the input signal to the control mechanism, by the logical multiplication of the ID and BUSISHAPE (the signal, one cycle behind the BUSIEN), a one cycle long signal ICMD is made and used in the internal circuit.

As described above, for the data OD clocked by the internal clock CLK, its signal, when BUSOEN (SET0) is asserted, is shaped into a 3-cycle signal that is output to the bus as BUSDO. On the other hand, the data BUSDI clocked by the BUSCLK is converted into an effective internal signal ID when BUSIEN is asserted.

Figure 9:
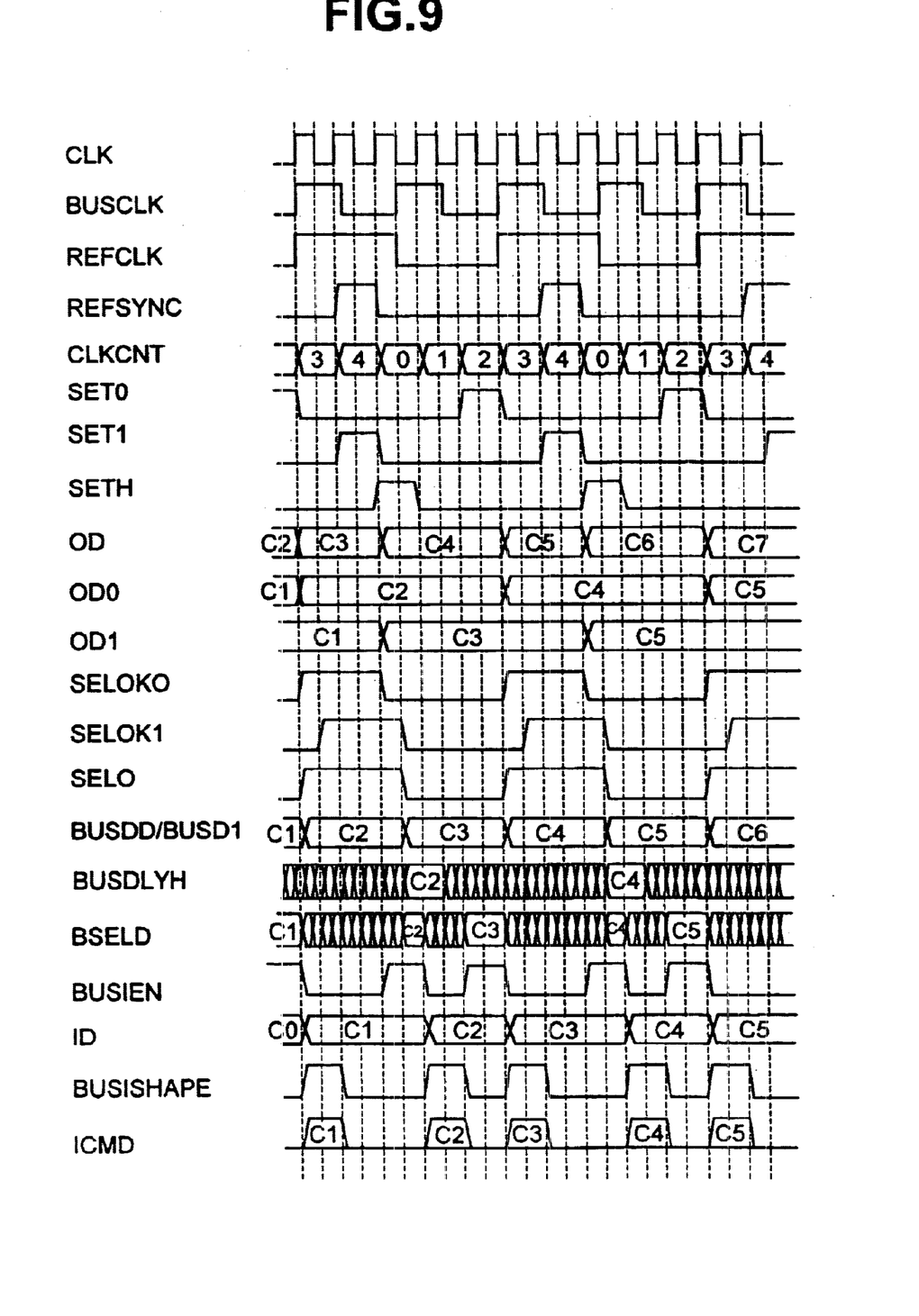
FIG. 9 is a time chart for input/output to/from the processor when the ratio of the processor's internal processing rate to the external bus rate is 5:2 in the circuit aspects shown in FIGS. 6 and 7.

FIG. 9 shows the timing chart of input/output to/from the processor core when the clock frequency ratio of the internal clock CLK to the bus clock BUSCLK and the reference clock REFCLK is 5:2:1 in the circuit aspects shown in FIGS. 6 and 7.

Using FIGS. 6 and 9, the operation of the bus output signal conversion circuit aspect is explained below. In the case where the above clock frequency ratio is true, SET0 is asserted to be 1 when CLKCNT is 2 and the OD0 output from the latch 100 enabled by SET0, when CLKCNT is 3, switches over to the OD in the state with the CLKCNT of 2 in the circuit section for processing output signals to the bus. SET1 is asserted to be 1 when CLKCNT is 4 and the OD1 output from the latch 101 enabled by SET, when CLKCNT is 0, switches over to the OD in the state with the CLKCNT of 4. The SEL0K0 output from the SR latch 103 is 1 when CLKCNT is 3 and 4 and the SEL0K1 output from the falling-edge-triggering latch 104 is 0.5 cycle behind the SEL0K0, and therefore SEL0 is 1 when CLKCNT is 3, 4, and 0 to 0.5. (Here, the CLKCNT of 0.5 means 0.5 cycles behind the CLKCNT of 0. This will be true for the remaining part of this specification.) Consequently, as BUSDO, OD0 is output to the bus when CLKCNT is 0.5 to 1, 1, and 2 and OD1 is output to the bus when CLKCNT is 3, 4, and 0 to 0.5.

Using FIGS. 7 and 9, the operation of the bus input signal conversion circuit aspect is explained below. In the circuit section for processing input signals from the bus, the BUSDLYH output from the falling-edge-triggering latch 112 is delayed by 0.5 to 1.5 of CLKCNT. SETH is asserted to be 1 when CLKCNT that is one cycle behind SET1 is 0. At this time, the BSELD output from the 2-input selector 111 is BUSDI in the state with the synchronous counter being 0.5. When CLKCNT is 2, the BSELD output is BUSDI in the state with the CLKCNT of 2. From the latch 110 enabled by BUSIEN, the output is an internal signal ID converted from the BUSDI in the state with the CLKCNT of 0.5 when CLKCNT is 1 and 2 and an internal signal ID converted from the BUSDI in the state with the CLKCNT of 2 when CLKCNT is 3, 4, and 0. When the ID is used as the input signal to the control mechanism, by the logical multiplication of the ID and BUSISHAPE (the signal, one cycle behind the BUSIEN), a one cycle long signal ICMD is made and used in the internal circuit.

As described above, for the data OD clocked by the internal clock CLK, its signal, when BUSOEN (SET0, SET!) is asserted, is shaped into a 2.5-cycle-long signal that is output to the bus. On the other hand, the data BUSDI clocked by the BUSCLK is converted into an effective internal signal ID when BUSIEN is asserted.

The embodiment wherein the clock of 50% duty is used with the internal-to-external clock frequency ratio being N:1 and N:2 was described above.

The embodiment wherein M-phase clock pulses with each in phase shifted by 1/M cycle are used when the internal-to-peripheral operating clock frequency ratio is N:M [where M is an integer] will be outlined below. Its basic circuitry is the same as described above and is not repeated.

M-phase clock CLKi [where i is 0 to M−1] with each clock pulse in phase shifted by 1/M cycle is obtained by modifying the synchronous signal generating circuit 25 or being input externally. CLK0 is assumed the internally operating clock CLK. The external bus access timing signal generating circuit 24 is modified; M lines instead of two signals SET0 and SET1 shown in FIG. 5 are required and they are represented as SETi.

Figure 10:
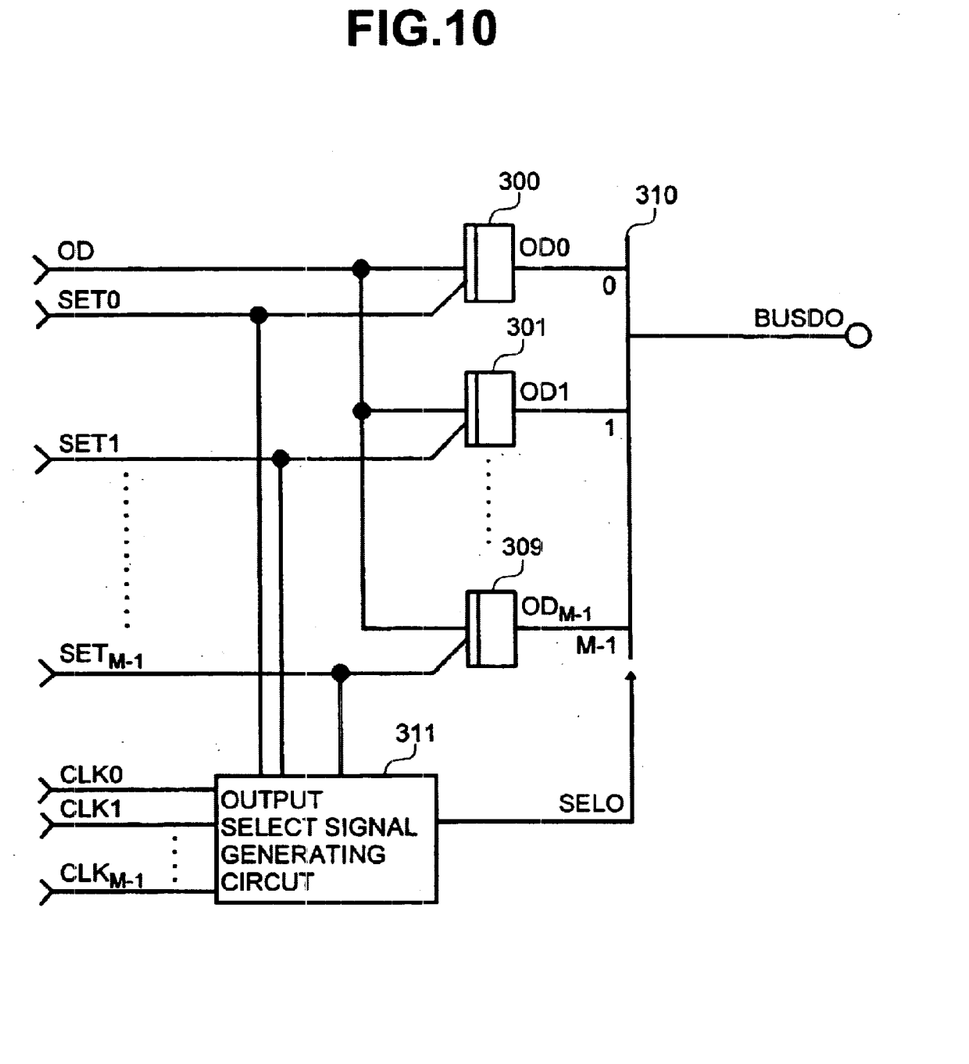
FIG. 10 is a schematic circuit diagram of the bus I/O signal conversion circuit shown in FIG. 1 wherein M-phase clock pulses with each in phase shifted by 1/M cycle are used, embodied for illustrating the intended output operation of the circuit at a ratio of the processor's internal processing rate to the external bus rate of N:M.
Figure 11:
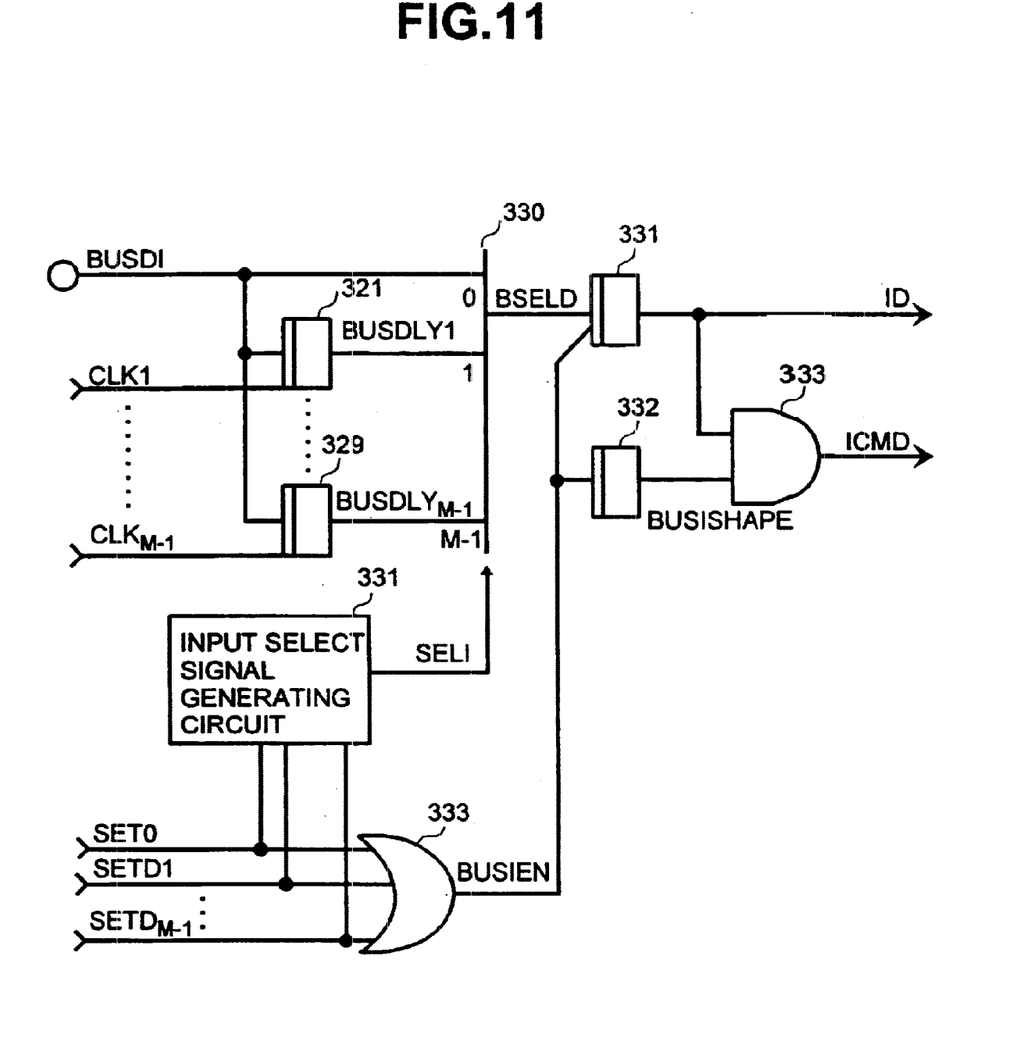
FIG. 11 is a schematic circuit diagram of the bus I/O signal conversion circuit shown in FIG. 1 wherein M-phase clock pulses with each in phase shifted by 1/M cycle are used, embodied for illustrating the intended input operation of the circuit at a ratio of the processor's internal processing rate to the external bus rate of N:M.

FIGS. 10 and 11 show the output and input aspects of the bus I/O signal conversion circuit 23 embodied to process one input/output signal in the case where the M-phase clock with each clock pulse in phase shifted by 1/M cycle is used.

By contrasting FIG. 10 with FIG. 6, it is seen that signal lines are increased by M including SET0 and SET1 signals which are only used in the circuitry shown in FIG. 6. ODj [where j is 0 to M−1], SETj, and CLKj are used in the circuitry shown in FIG. 10.

Data OD clocked by the internal clock CLK is received by latches 300 to 309 that are enabled by SETj. A selector 310 selects one of the outputs ODj from these latches, according to the SEL0 signal state, and outputs it to the bus as BUSDO. The SEL0 is a signal whose state changes per N/M cycle, that is, a select signal in synchronization with the bus cycle. This signal is generated by an output select signal generating circuit 311 from SETj and CLKj. The detail on the output select signal generating circuit 311 is not described herein because its design is based on technique within the range that engineers involved in the field relevant to the invention can easily conceive how it is formed.

By contrasting FIG. 11 with FIG. 7, it is seen that BUSDLYH changes to BUSDLYk [where k is 1 to M−1]. BUSDI is input to CLKk clocked latches 321 to 329 that delay the signal and outputs BUSDLYk signals. A selector 330 selects one of the BUSLLYk signals, according to the select signal SEL1 state, and produces BSELD. ID and ICMD are produced from the BSELD in the same way as explained with FIG. 7; the detail thereof is not repeated. The SEL1 is generated by an input select signal generating circuit 331 from SET0 and SETDk produced by delaying SETk by one cycle. BUSIEN is the logical add of SET0 and SETDk as is the case with FIG. 7. The detail on the input select signal generating circuit 331 is not described herein because its design is based on technique within the range that engineers involved in the field relevant to the invention can easily conceive how it is formed.

In the present embodiment, a clock of 50% duty with a frequency that is M/2 times the frequency of the internal clock can be used when the internal-to-peripheral operating clock frequency ratio is N:M. The operation with such clock can also be realized by modifying the external bus access timing signal generating circuit 24 and the bus I/O signal conversion circuit 23. This modification is not described herein because it is based on technique within the range that engineers involved in the field relevant to the invention can easily conceive how to do it.

Features of the present invention are as follows. Even when processor chip design specifications require that a plurality of clocks, such as the internal clock, the clock for L2 cache interface, and the clock for external bus interface be compatible and the lines for supplying the clocks be wired-in, wiring only a single clock supply line meets the above requirement if the present invention is applied, provided the internal-to-peripheral clock frequency ratio is N:1 or N:2. Thus, wiring area for clock supply can be reduced, which also decreases the power consumption due to such wiring, and a processor chip supporting the compatibility of a plurality of clocks can be fabricated with reduced cost. By simply supplying a reference clock to another processor, peripheral equipment, or bus connected to the processor, the processor and another processor or the peripheral can be synchronized easily. Furthermore, by using M-phase clock pulses with each in phase shifted by 1/M cycle or clock pulses of 50% duty with a frequency that is M/2 times the frequency of the internal clock, frequency conversion control can be achieved for the internal-to-external clock frequency ratio of N:M.

The foregoing invention has been described in terms of preferred embodiments. However, those skilled, in the art will recognize that many variations of such embodiments exist. Such variations are intended to be within the scope of the present invention and the appended claims.

What is claimed is:

1. Information processing equipment that performs data transfer via an external bus to/from peripheral equipment which operates, based on a clock whose frequency is different from the internal clock frequency of the processing equipment comprising:

a first signal generating circuit for supplying a common reference clock to the information processing equipment as well as the peripheral equipment and generating a reference sync signal from the reference clock to synchronize the information processing equipment and the peripheral equipment;

a second signal generating circuit for generating the internal clock of the information processing equipment from the reference clock;

an external bus access timing signal generating circuit for generating timing signals to control the timing of access to the external bus which operates in synchronization with the clock frequency for peripheral operation in accordance with an internal-to-peripheral clock frequency ratio; and     a bus I/O signal conversion circuit for carrying out data input/output from/to the bus in accordance with the timing signals generated by the external bus access timing signal generating circuit.

2. The information processing equipment according to claim 1, wherein:

the second signal generating circuit uses PLL to generate the internal clock of the information processing equipment from the reference clock.

3. The information processing equipment according to claim 1, wherein:

the bus I/O signal conversion circuit uses internal clock pulses of 50% duty and a latch that is activated by the rising edge of the clock pulse and a latch that is activated by the falling edge of the clock pulse to execute frequency conversion and executes data transfer to/from peripheral equipment which operates, based on a clock with the internal-to-external clock frequency ratio of N:2 [where N≧2].

4. The information processing equipment according to claim 3, wherein:

the bus I/O signal conversion circuit converts a signal input from the external bus into an internal signal that is effective in one or more cycles of the internal clock by changing the signal to the corresponding signal delayed by 0.5 cycle based on the internal clock in accordance with the timing signals generated by the external bus access timing signal generating circuit.

5. The information processing equipment according to claim 3, wherein:

the bus I/O signal conversion circuit generates a select signal whose state changes per N/2 cycle from the timing signals generated by the external bus access timing signal generating circuit and selects a signal to be output from the information processing equipment to the external bus by using the select signal.

6. The information processing equipment according to claim 1, wherein:

the bus I/O signal conversion circuit uses M-phase clock pulses with each in phase shifted by 1/M cycle [where M is an integer] to execute frequency conversion and executes data transfer to/from peripheral equipment which operates based on a clock with the internal-to-external clock frequency ratio of N:M [where N≧M≧2].

7. The information processing equipment according to claim 6, wherein:

the bus I/O signal conversion circuit comprises:

a circuit for generating a select signal whose state changes per one or more cycles from the timing signals generated by the external bus access timing signal generating circuit, M−1 pieces of latches for holding a signal input from the external bus, while being clocked by M-phase clock pulses with each in phase shifted by 1/M cycle, a latch for holding a signal to enter the internal selected in accordance with the select signal from among the signal input from the external bus and the signals output from the M−1 pieces of latches, while being clocked by the internal clock.

8. The information processing equipment according to claim 6, wherein:

the external bus access timing signal generating circuit generates signals to indicate timing of access to the external bus from M-phase clock pulses with each in phase shifted by 1/M cycle in accordance with an internal-to-peripheral clock frequency ratio; and the bus I/O signal conversion circuit generates a select signal whose state changes per N/M cycle from the M-phase clock pulses and converts a signal selected in accordance with the select signal from among M pieces of signals output from the latches, each of which is enabled by one of the access timing signals and holds an internal signal from the information processing equipment, while being clocked by the internal clock, into an output signal to the external bus.

9. The information processing equipment according to claim 2, wherein:

the bus I/O signal conversion circuit uses internal clock pulses of 50% duty and a latch that is activated by the rising edge of the clock pulse and a latch that is activated by the falling edge of the clock pulse to execute frequency conversion and executes data transfer to/from peripheral equipment which operates, based on a clock with the internal-to-external clock frequency ratio of N:2 [where N≧2].

10. The information processing equipment according to claim 9, wherein:

the bus I/O signal conversion circuit converts a signal input from the external bus into an internal signal that is effective in one or more cycles of the internal clock by changing the signal to the corresponding signal delayed by 0.5 cycle based on the internal clock in accordance with the timing signals generated by the external bus access timing signal generating circuit.

11. The information processing equipment according to claim 9, wherein:

the bus I/O signal conversion circuit generates a select signal whose state changes per N/2 cycle from the timing signals generated by the external bus access timing signal generating circuit and selects a signal to be output from the information processing equipment to the external bus by using the select signal.

12. The information processing equipment according to claim 2, wherein:

the bus I/O signal conversion circuit uses M-phase clock pulses with each in phase shifted by 1/M cycle [where M is an integer] to execute frequency conversion and executes data transfer to/from peripheral equipment which operates, based on a clock with the internal-to-external clock frequency ratio of N:M [where N≧M≧2].

13. The information processing equipment according to claim 12, wherein:

the bus I/O signal conversion circuit comprises:

a circuit for generating a select signal whose state changes per one or more cycles from the timing signals generated by the external bus access timing signal generating circuit;

M−1 pieces of latches for hold a signal input from the external bus, while being clocked by M-phase clock pulses with each in phase shifted by 1/M cycle, a latch for holding a signal to enter the internal selected in accordance with the select signal from among the signal input from the external bus and the signals output from the M−1 pieces of latches, while being clocked by the internal clock.

14. The information processing equipment according to claim 12, wherein:

the external bus access timing signal generating circuit generates signals to indicate timing of access to the external bus from M-phase clock pulses with each in phase shifted by 1/M cycle in accordance with an internal-to-peripheral clock frequency ratio; and the bus I/O signal conversion circuit generates a select signal whose state changes per N/M cycle from the M-phase clock pulses and converts a signal selected in accordance with the select signal from among M pieces of signals output from the latches, each of which is enabled by one of the access timing signals and holds an internal signal from the information processing equipment, while being clocked by the internal clock, into an output signal to the external bus.

15. An information processing system comprising:

information processing equipment that operates, based on a predetermined clock frequency;

peripheral equipment that operates, based on a clock whose frequency is different from the predetermined clock frequency for processing equipment operation; and an external bus connecting the information processing equipment and the peripheral equipment, operating in synchronization with the clock frequency for the peripheral equipment, wherein a common reference signal is supplied to the information processing equipment and the peripheral equipment, and the information processing equipment comprising:

a first signal generating circuit for generating a reference sync signal from the reference clock to synchronize the information processing equipment and the peripheral equipment;

a second signal generating circuit for generating the internal clock of the information processing equipment from the reference clock;

an external bus access timing signal generating circuit for generating timing signals to control the timing of access to the external bus in accordance with an internal-to-peripheral clock frequency ratio;

a bus I/O signal conversion circuit for carrying out data input/output from/to the bus in accordance with the timing signals generated by the external bus access timing signal generating circuit.

16. The information processing system according to claim 15, wherein:

the second signal generating circuit uses PLL to generate the internal clock of the information processing equipment from the reference clock.

17. The information processing system according to claim 15, wherein:

the bus I/O signal conversion circuit uses internal clock pulses of 50% duty and a latch that is activated by the rising edge of the clock pulse and a latch that is activated by the falling edge of the clock pulse to execute frequency conversion and executes data transfer to/from peripheral equipment which operates, based on a clock with the internal-to-external clock frequency ratio of N:2 [where N≧2].

18. A multiprocessor system comprising:

a plurality of processors operating, based on a predetermined clock frequency; and an external bus connecting the processors, operating, based on a clock whose frequency is different from the predetermined frequency for processor operation wherein a common reference clock is supplied to the processors, and each processor comprising:

a first signal generating circuit for generating a reference sync signal from the reference clock to synchronize the processor and the external bus;

a second signal generating circuit for generating the internal clock of the processor from the reference clock;

an external bus access timing signal generating circuit for generating timing signals to control the timing of access to the external bus in accordance with a clock frequency ratio of the processor to the external bus;

a bus I/O signal conversion circuit for carrying out data input/output from/to the bus in accordance with the timing signals generated by the external bus access timing signal generating circuit.

19. The multiprocessor system according to claim 18, wherein:

the second signal generating circuit uses PLL to generate the internal clock of the processor from the reference clock.

20. The multiprocessor system according to claim 18, wherein:

the bus I/O signal conversion circuit uses internal clock pulses of 50% duty and a latch that is activated by the rising edge of the clock pulse and a latch that is activated by the falling edge of the clock pulse to execute frequency conversion and executes data input/output from/to the external bus which operates, based on a clock with the internal-to-external clock frequency ratio of N:2 [where N≧2].

* * * * *